(No Model.)

A. RIPPIEN.
COVER FOR HOPPERS OF GRINDING MILLS.

No. 269,116. Patented Dec. 12, 1882.

Witnesses
James F. Tobin
Harry Drury

Inventor,
Adolph Rippien
by his Attorneys.
Howson and Son

UNITED STATES PATENT OFFICE.

ADOLPH RIPPIEN, OF READING, PA., ASSIGNOR TO WILLIAM M. GRISCOM, MATTHAN HARBSTER, AND WILLIAM HARBSTER, ALL OF SAME PLACE.

COVER FOR HOPPERS OF GRINDING-MILLS.

SPECIFICATION forming part of Letters Patent No. 269,116, dated December 12, 1882.

Application filed May 15, 1882. (No model.)

*To all whom it may concern:*

Be it known that I, ADOLPH RIPPIEN, a citizen of the United States, and a resident of Reading, Pennsylvania, have invented certain Improvements in Covers for Hoppers of Grinding-Mills, of which the following is a specification.

My invention relates to a certain improvement in that class of covers for the hoppers of coffee and other mills in which are combined a fixed half and a movable half, the latter being free to rotate on the spindle of the mill, my improvement being simply a novel plan of constructing such a cover and applying it to the hopper.

Figure 1:
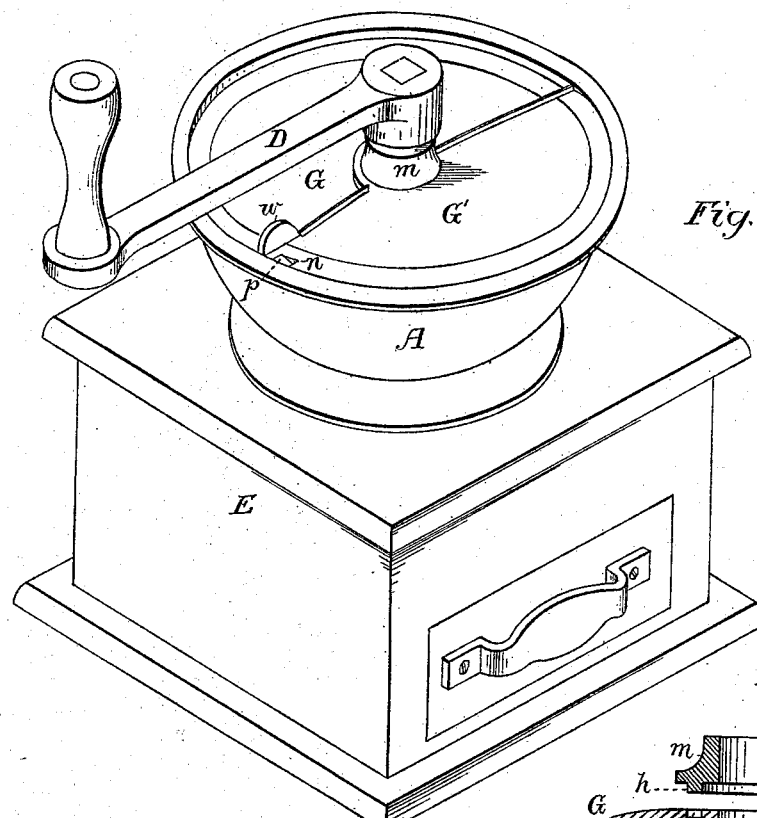
Figure 4:
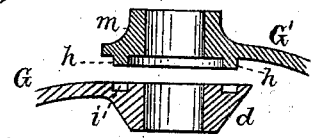
Figure 2:
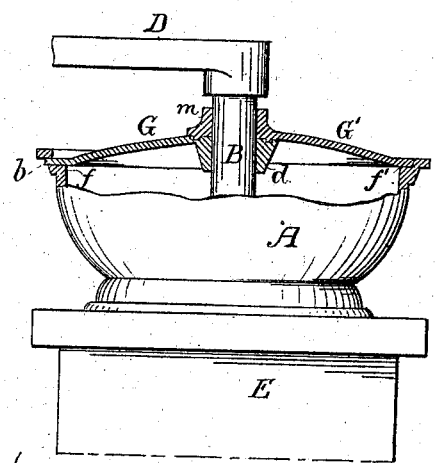
Figure 3:
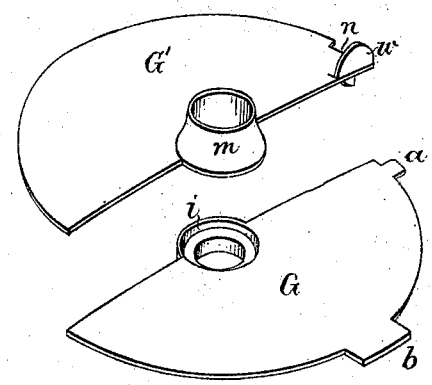

In the accompanying drawings, Figure 1 is a perspective view of a coffee-mill with my improved hopper-cover; Fig. 2, a side view, partly in section; Fig. 3, a detached perspective view of the two plates composing the cover, and Fig. 4 vertical sections of portions of the plates detached from each other.

A is the hopper, B the burr-spindle, D the handle, and E the receiving-box, of a coffee-mill, the shell and burr of which are not shown in the drawings, as they may be the same as those in common use.

The hopper is of the circular form represented, and its cover consists of two plates or sections, G G', of a disk. The plate G has on its edge two projections, $a$ and $b$, adapted to slots in the hopper, as shown in Fig. 2, so that when the projections are fitted to the slots the plate will be fixed and cover half of the hopper, there being within the latter a ledge, $f$, for supporting the plate, which has a bearing, $d$, for the spindle B of the burr. The other plate, G', has a tubular projection, $m$, through which the said spindle passes, and beneath the plate, and concentric with the said projection, is an annular rib, $h$, adapted to a corresponding recess, $i$, in the plate G. The ledge $f'$ in the hopper for supporting the plate G' is higher than the ledge $f$ for supporting the plate G, so that on turning the plate G' it will pass over the plate G. There is a notch, $n$, in the edge of the plate G', so adapted to a projection, $p$, in the hopper that when the said plate is in the position Fig. 1 the projection will prevent it from turning. By a slight push exerted on a lip, $w$, however, the plate G' may be made to override the projection $p$ of the hopper, and may be so turned that half the hopper will be exposed. When the hopper is closed by the adjustment of the plate G' the straight edge of the latter plate will slightly overlap that of the plate below.

I claim as my invention—

1. The combination of the hopper A, having ledges $f\ f'$ at different levels, with the fixed half, G, of the cover, adapted to rest upon the lower ledge, and the movable half, G', resting upon the upper ledge and adapted to swing around over the portion G, as set forth.

2. The combination of the portion G of the cover, having projections $a$ and $b$, with a hopper slotted for the reception of said projections, as set forth.

In testimony whereof I have signed my name to this specification in the presence of two subscribing witnesses.

ADOLPH RIPPIEN.

Witnesses:
F. PIERCE HUMMEL,
I. D. PAWLING.